United States Patent [19]

Nishimura et al.

[11] 4,183,629
[45] Jan. 15, 1980

[54] ELECTRONIC OPTICAL DISPLAY DEVICE AND METHOD OF MANUFACTURING THE SAME

[75] Inventors: Katsuo Nishimura, Tokorozawa; Hisao Wakabayashi; Takatoshi Osaka, both of Higashikurume; Kazunari Kume, Tokorozawa; Yasuhiro Ogura, Tokyo; Yukio Miya, Tokorozawa, all of Japan

[73] Assignee: Citizen Watch Co. Ltd., Tokyo, Japan

[21] Appl. No.: 815,684

[22] Filed: Jul. 14, 1977

[30] Foreign Application Priority Data

Jul. 21, 1976 [JP] Japan .................. 51-97303[U]
Aug. 12, 1976 [JP] Japan .................. 51-96401
Dec. 7, 1976 [JP] Japan .................. 51-146201
Dec. 13, 1976 [JP] Japan .................. 51-149579
Dec. 13, 1976 [JP] Japan .................. 51-149580

[51] Int. Cl.² .......................................... G02F 1/13
[52] U.S. Cl. ................................ 350/334; 350/331; 350/357

[58] Field of Search ............ 350/320, 330, 336, 343, 350/357, 334, 331; 58/50 R; 29/592 R

[56] References Cited

U.S. PATENT DOCUMENTS

| 3,661,444 | 5/1972 | Matthies | 350/335 |
| 3,903,519 | 9/1975 | Zega | 350/335 X |
| 3,932,024 | 1/1976 | Yaguchi et al. | 350/338 |
| 3,992,082 | 11/1976 | Katz | 350/335 |
| 4,043,638 | 8/1977 | Kaufmann | 350/330 |

Primary Examiner—Edward S. Bauer
Attorney, Agent, or Firm—Sherman & Shalloway

[57] ABSTRACT

An electronic optical display device comprising two substrates and an electronic optical substance sealed in a gap formed between said substrates and displaying when an electric voltage is applied thereto is disclosed. The device comprises two upper and lower substrates which are the same in plane configuration and a lead electrode extending along the side surface of said substrates and is most suitable for use in a thin type digital watch.

10 Claims, 29 Drawing Figures

ELECTRONIC OPTICAL DISPLAY DEVICE AND METHOD OF MANUFACTURING THE SAME

BACKGROUND OF THE INVENTION

1. Field of the Invention

This invention relates to electronic optical display devices and methods of manufacturing the same, and more particularly to an electronic optical display device comprising two substrates which are the same in plane configuration and a method fo manufacturing the same.

2. Description of the Prior Art

An electronic optical display device comprising two transparent substrates and an electro-optical substance such as a liquid crystal, electrochromic substance and the like sealed in a gap formed between the substrates has heretofore been well known. In such kind of device, one of the substrates is made larger than the other substrate for the purpose of easily connecting a lead electrode through a connector to a driving circuit.

In an electronic optical display device for a thin type digital watch, it is preferable to make its glass substrate thin. As a result, two glass substrates are adhered together and a liquid crystal is injected and sealed into a gap formed between the two substrates, then one of the substrates is made 0.3 mm in thickness and the total thickness of the two substrates is made 0.6 mm by lapping and polishing working. Such method, however, has the drawback that the lead electrode provided on one of the substrates and projected from the other substrate is liable to be cracked during the working and that a shock resistant property of the display device incorporated into the watch becomes degraded.

That is, in a conventional liquid crystal display device shown in FIGS. 1 and 2 and comprising an upper glass substrate 1, a lower glass substrate 2, a segment type transparent electrode 3, a common transparent electrode 4, a sealing portion 5, a lead electrode 6, a nematic liquid crystal layer 7, an upper light deflecting plate 8, a lower light deflecting plate 9, and a reflecting plate 10, the upper glass substrate 1 is made larger than the lower glass substrate 2 and projected therefrom by a distance which corresponds to the dimension of the lead electrode 6. In FIG. 1 is shown a time displayed on the upper glass substrate for the sake of explanation. Similarly, such time is also displayed on the upper glass substrate shown in the following figures. In order to manufacture the conventional liquid crystal display cell shown in FIGS. 1 and 2, the upper and lower glass substrates adhered together by the sealing portions are subjected to lapping and polishing working so as to make the thickness of the upper and lower glass substrates 1, 2 about 0.3 mm, thereby forming a thin type cell whose overall thickness is about 0.6 mm. In this case, however, there is a risk of that portion of the upper glass substrate which is coated with the lead electrode 6 being broken, thereby rendering the production of the thin type cell in mass production scale difficult.

In addition, in a digital watch which makes use of a conventional electronic display device such as a liquid crystal etc., a windshield of the watch is separated from the glass substrate for the liquid crystal so as to form a space therebetween. Such conventional construction has the drawback that the watch as a whole becomes large in thickness and a thin type digital watch could not be made in practice.

Various kinds of methods of manufacturing the display panel have been proposed. These methods are classified into a method of manufacturing one display panel in which two substrates corresponding to one display panel are worked and then adhered or sealed together and a method of manufacturing a plurality of display panels in which two large types substrates corresponding to a plurality of display panels are worked and then adhered or sealed together to form an assembly and finally the assembly is separated into a plurality of display panels.

The method of manufacturing one display panel is good in yield, but has the disadvantage that successive steps result in one display panel only. In the method of manufacturing a plurality of display panels, it is possible to manufacture a plurality of display panels by successive steps, but the yield thereof is inferior to that of the method of manufacturing one display panel. As seen from the above, both the method of manufacturing one display panel and the method of manufacturing a plurality of display panels have their own drawbacks, respectively.

OBJECT OF THE INVENTION

A principal object of the invention is to provide an electronic optical display device and a method of manufacturing the same, which can eliminate the above mentioned drawbacks which have been encountered with the prior art techniques.

Another object of the invention is to provide an electronic optical display device which is provided with a side surface lead electrode which cannot be easily broken.

A further object of the invention is to provide an electronic optical display device which can prevent that side surface portion and that edge portion of a substrate which is coated with a lead electrode from being broken, leaked and deteriorated due to corrosion of the like.

A still further object of the invention is to provide a method of manufacturing a plurality of display panels, which can improve yields, can simplify a separating step and can manufacture a plurality of display panels in mass production scale in a less expensive manner.

BRIEF DESCRIPTION OF THE DRAWINGS

FIGS. 19 to 21 illustrate a conventional method of manufacturing a display panel, in which FIG. 19 is a longitudinal cross sectional view of a continuous display panel, FIG. 20 is its plan view and FIG. 21 is an enlarged longitudinal cross sectional view showing a step of cutting a lower glass substrate by means of a cutting blade;

FIGS. 22 to 24 illustrate a method of manufacturing a display panel according to the invention, in which FIG. 22 is a longitudinal cross sectional view of a continuous display panel, FIG. 23 is its plan view and FIG. 24 is an enlarged cross sectional view of a lead electrode;

FIGS. 26 to 29 illustrate an embodiment of a mask vapor deposition process used in a method of manufacturing a display panel according to the invention, in which FIG. 26 is a fragmentary perspective view of a mask arrangement, FIG. 27 is a perspective view of a liquid crystal panel, FIG. 28 is a partial enlarged cross sectional view of a liquid crystal cell and FIG. 29 is a schematic front elevational view of a rotatably mounted jig used in a mask vapor deposition process.

PREFERRED EMBODIMENT OF THE INVENTION

Figure 2:
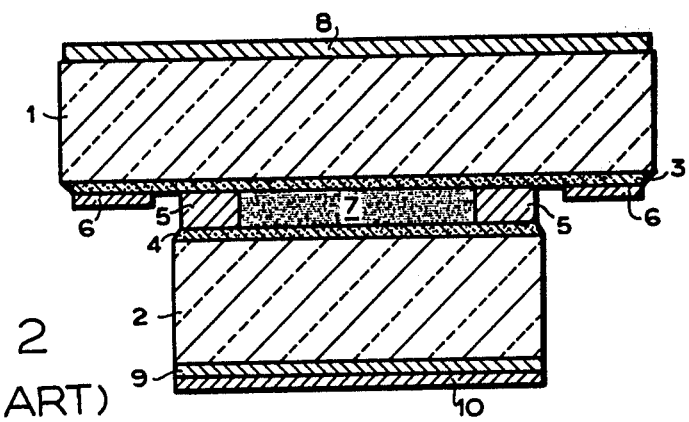
FIG. 2 is an enlarged cross section taken along a line A—A of FIG. 1.
Figure 3:
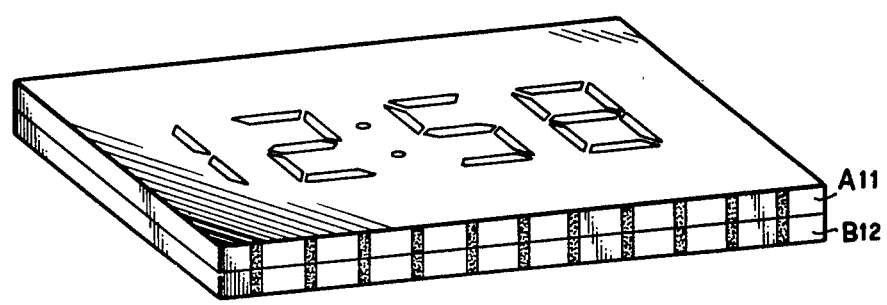
FIG. 3 is a schematic perspective view of a liquid crystal display cell according to the invention.
Figure 4:
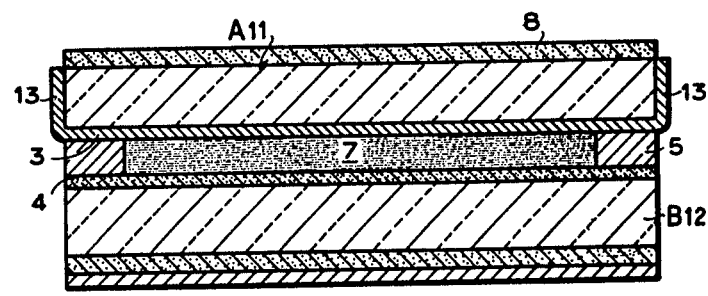
FIG. 4 is an enlarged longitudinal cross sectional view of a liquid crystal display cell according to the invention.

In FIG. 3 is shown a thin type liquid cyrstal display cell according to the invention. The thin type liquid crystal display cell shown in FIG. 3 is composed of an upper glass substrate A11 and a lower glass substrate B12, these substrates being substantially the same in plane configuration. As shown in FIG. 4, the upper glass substrate A11 is provided at its lower surface with a segment type transparent electrode 3 which is extended so as to form a lead electrode 13 covering the side surface of the upper glass substrate A11. Both the segment type transparent electrode 3 and the side surface lead electrode 13 are composed of thin films formed in $In_2O_3$ or $S_nO_2$ and formed on the lower and side surfaces of the upper glass substrate A11 by means of a conventional PVD process or CVD process and then subjected to an etching process so as to form patterns. Both the upper glass substrate A11 and the lower glass substrate B12 are worked into substantially the same plane configuration and then subjected to electrode and liquid crystal orientation process to form a low melting point sealing member 5. Into a space formed in the low melting point sealing assembly 5 is injected and sealed a nematic liquid crystal layer 7. Then, the assembly is subjected to a glass working process and becomes in thickness of the order of about 0.6 mm. In this glass working process, since both the upper and lower glass substrates A11 and B12 are substantially the same in plane configuration, there is no risk of the conventional lead electrode 6 shown in FIG. 2 being broken, thereby improving the yield in mass production scale.

Figure 5:
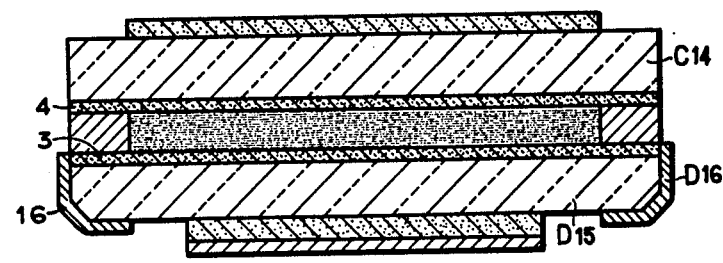
FIG. 5 is an enlarged longitudinal cross sectional view of a modified embodiment of the liquid crystal display cell shown in FIG. 4.

In FIG. 5 is shown another embodiment of the invention. In the present embodiment, an upper glass substrate C14 is provided at its lower surface with a common transparent electrode 4 and a lower glass substrate D15 is provided at its upper surface with a segment type transparent electrode 3 and provided at its side surface with a side surface lead electrode D16 formed of a different metal by means of a thick film process, PVD process and the like. The lower glass substrate D15 may be subjected to a chamfering process so as to form the side surface lead electrode D16 along the chamfered portion whereby the side surface lead electrode D16 is not easily broken.

Figure 6:
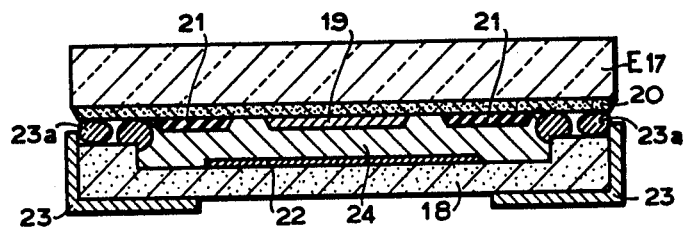
FIG. 6 is an enlarged longitudinal cross sectional view of an electrochromic display cell according to the invention.
Figure 7:
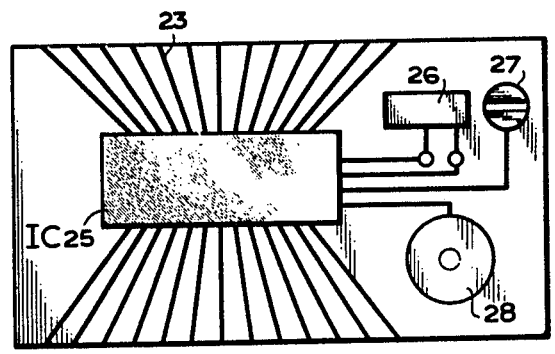
FIG. 7 is a plan view of the electrochromic display cell shown in FIG. 6 showing parts arranged on a circuit substrate.

In FIGS. 6 and 7 is shown an electrochromic display cell according to the invention. In the present electrochromic display cell, between an upper glass substrate E17 and a lower ceramic substrate 18 are sealed an electrochromic layer 19, a transparent electrode 20 and an insulating layer 21. The transparent electrode 20 is composed of a thin film formed of $In_2O_3$ or $S_nO_2$. The insulating layer 21 is composed of a thin film formed of $SiO_2$. The electrochromic layer 19 is composed of a thin film formed of $WO_3$ or $MoO_3$. The ceramic substrate 18 is provided at its side and lower surfaces with a lead electrode 23 to be connected to a counter electrode 22 and an IC. Between the upper glass substrate E17 and the lower ceramic substrate 18 is injected and sealed an electrolyte 24. Between the transparent electrode 20 and the lead electrode 23 is formed an electrically conductive portion 24a, so as to electrically connect the transparent electrode 20 to the lead electrode 23.

To the lower surface of the lower ceramic substrate 18 are bonded not only the lead electrode 23 but also an IC 25 as shown in FIG. 7. The lower ceramic substrate 18 is also provided at its lower surface with a crystal oscillator 26, a trimmer condenser 27, a battery cell 28 and the like to complete a module of a digital watch.

As seen from the above described embodiments, in an electronic display device for displaying informations comprising two upper and lower substrates at least one of which is transparent and an electro-optical substance such as a liquid crystal, electrochromic substance, etc. sealed between the two substrates, the use of the two substrates substantially the same in plane configuration provides the important advantage that a thin type display device can be yielded in mass production scale and can reveal a significantly large effect.

Figure 8:
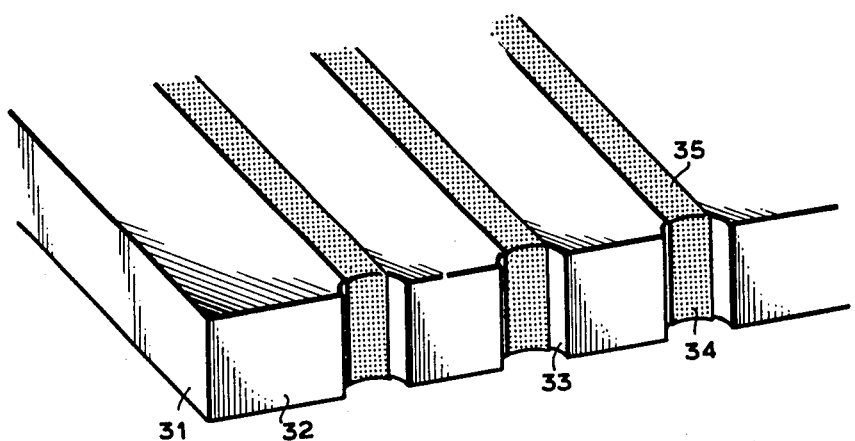
FIG. 8 is an enlarged perspective view of another embodiment of a liquid crystal display cell according to the invention showing main parts of a lower glass substrate.

An embodiment of the lead electrode extending along the side surface of the lower substrate according to the invention will now be described with reference to FIGS. 8 to 10. As shown in FIG. 8, a lower glass substrate 31 is provided at its side surface 32 with a semicircular groove 33 coated with a side surface electrode 34. The lower glass substrate 31 is provided at its upper surface with a lead electrode 35 which is extended through the side surface electrode 34 to the lower surface of the lower glass substrate 31. The side surface groove 33 may be formed by a supersonic wave working process, diamond grinding process or etching process and the like. The side surface electrode 34 may be coated on the side surface groove 34 by a thin film vapor deposition process or by a thick film forming process such as a screen printing process, dispense process and the like.

Figure 9:
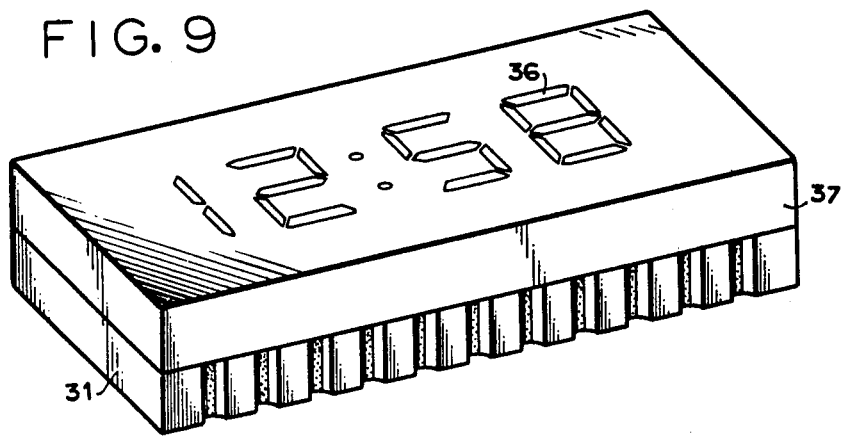
FIG. 9 is a schematic perspective view of a liquid crystal cell for a watch which makes use of the lower glass substrate shown in FIG. 8.

In FIG. 9 is shown a liquid crystal display cell 36 formed by bonding the lower glass substrate 31 to an upper glass substrate 37. Between the upper and lower glass substrates 37 and 31 there is formed a gap having a width of about 10μ into which is sealed a nematic liquid crystal layer. In the present embodiment, the nematic liquid crystal layer is sealed in the gap formed between the upper and lower glass substrates. Alternatively, use may also be made of not only a nematic system which makes use of a deflecting plate and a reflecting plate, but also a guest-host effect or a DS effect.

Figure 10:
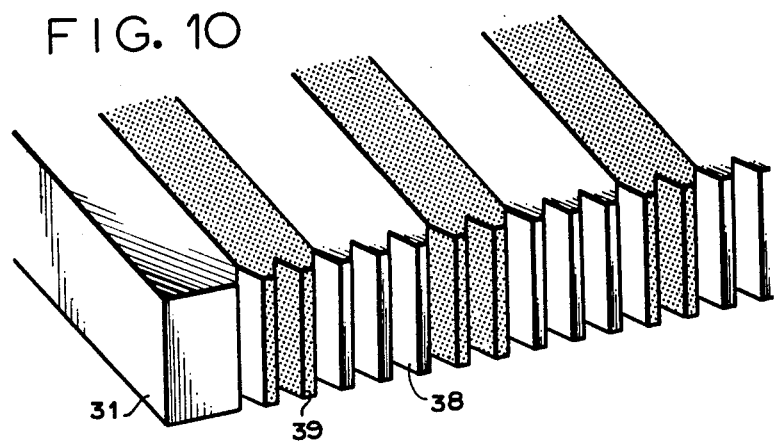
FIG. 10 is an enlarged perspective view of a modified embodiment of the lower glass substrate shown in FIG. 8 showing main parts.

In FIG. 10 is shown a modified embodiment of the side surface electrode 34 shown in FIG. 8. In the present embodiment, provision is made of a plurality of triangular-shaped side surface grooves 38 spaced apart from each other by a small pitch. As a result, a side surface electrode 39 is coated over a plurality of side surface grooves 38.

The use of the measures of providing the side surface electrode 39 coated over the plurality of the side surface grooves 38 ensures a width of the side surface electrode 39 which is equal to the width of the plurality of the side surface grooves 38 and provides the important advantage that possibilities of breaking the side surface electrode 39 by the breakage, etc. of the lower glass substrate 31 can be significantly reduced and that reliability of the display cell 36 can be improved.

Figure 11:
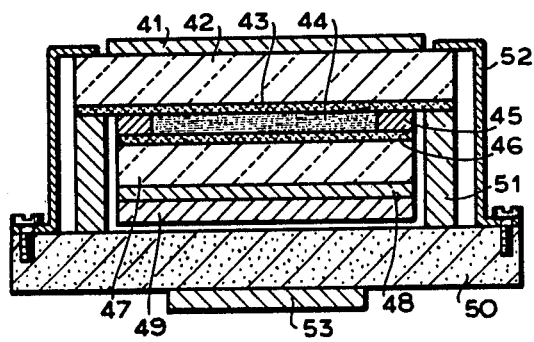
FIG. 11 is a longitudinal cross sectional view of a module which mades use of a conventional liquid crystal cell.

In FIG. 11 there is shown a module for a digital watch which makes use of the conventional liquid crystal cell. The module is composed of an upper light deflecting plate 41, an upper glass substrate 42, an upper transparent electrode 43, a liquid crystal layer 44, a sealing portion 45, a lower transparent electrode 46, a lower glass substrate 47, a lower light deflecting plate 48, a reflecting plate 49, a module ceramic substrate 50, an electrically conductive connector rubber 51, a liquid crystal holding spring 52 and an IC 53 for a driving circuit.

The upper glass substrate 42 is made larger than the lower glass substrate 47. The upper transparent electrode 43 has its end connected through the electrically conductive connector rubber 51 and a lead wire provided on the module ceramic substrate 50 to the IC 53 for the driving circuit.

Figure 12:
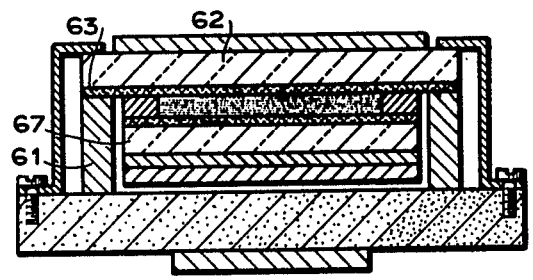
FIG. 12 is a longitudinal cross sectional view of a module which makes use of a conventional liquid crystal cell whose upper and lower glass substrates are made thin in thickness.

In FIG. 12 there is shown another module for a digital watch which makes use of the conventional liquid crystal cell. In the present conventional module, in order to make it thin, both an upper glass substrate 62 and a lower glass substrate 67 are made thin. If the upper glass substrate 62 is made too thin, an upper transparent electrode 63 is liable to be easily broken at its end. Experimental tests have yielded the result that if such digital watch is dropped on ground, shocks produced at the time of dropping are subjected through an electrically conductive connector rubber 61 to the upper glass substrate 62 only, and that hence it is impossible to make the thickness of the upper glass substrate 62 thinner than 0.5 mm, thereby rendering it difficult to make the digital watch thin.

Figure 13:
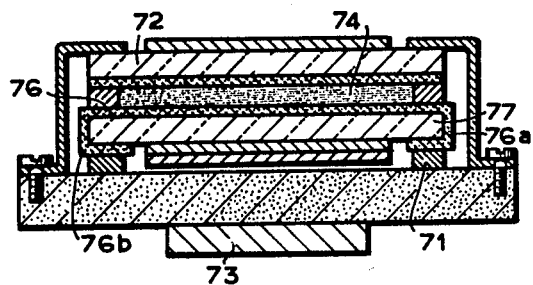
FIG. 13 is a longitudinal cross sectional view of a module comprising a crystal cell whose upper and lower glass substrates are made substantially the same in plane configuration and size.

In FIG. 13 there is shown a further module for a digital watch in which use is made of a thin type upper glass substrate 72 and a thin type lower glass substrate 77. In the present example, the lower transparent electrode 76 is extended to the side surface of the thin type lower glass substrate 77 and to that surface of the thin type lower glass substrate 77 which is opposed to a liquid crystal layer 74 to form a side surface lead electrode 76a and a counter surface lead electrode 76b which is connected through an electrically conductive connector rubber 71 and a module ceramic substrate to an IC 73 for a driving circuit.

The digital watch shown in FIG. 13 can absorb shocks produced when it is dropped onto ground by both the thin type upper glass substrate 72 and the thin type lower glass substrate 77, so that it is possible to make the thickness of each of these substrates smaller than 0.5 mm.

The electronic optical display device shown in FIG. 13 has the disadvantage that the transparent electrode substance is often liable to be touched with an operator's finger or any other objects during the step of manufacturing or assembling the liquid crystal cell and becomes broken.

Figure 14:
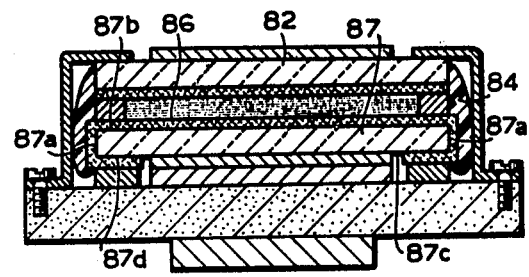
FIG. 14 is a longitudinal cross sectional view of a module inclusive of a liquid crystal cell in which transparent electrodes are provided with a guard film according to the invention.

In FIG. 14 there is shown one embodiment of the invention. In the present embodiment, in order to obviate the above mentioned disadvantage, a thin type lower glass substrate 87 is provided on its side surface portion 87a, upper surface edge portion 87b and counter surface portion 87c with a guard film 84 painted or vapor deposited thereon. Reference numeral 82 designates a thin type upper glass substrate and 86 illustrates a transparent electrode. The use of the guard film 84 provides the important advantage that the transparent electrode 86 is prevented from contacting with any other objects and from being broken during assembling of the liquid crystal cell, and that the transparent electrode 86 is prevented from contacting with the operator's finger, etc. and from becoming dirty and hence deteriorated.

Figure 15:
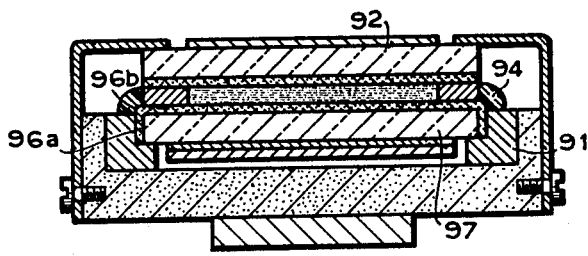
FIG. 15 is a longitudinal sectional view of a modified embodiment of the module shown in FIG. 14.

In FIG. 15 there is shown another embodiment of the invention. In the present embodiment, a lead electrode is provided at its corner portion 96b and side surface portion 96a with a guard film 94. The side surface portion 96a is connected through an electrically conductive connector rubber 91 and a module ceramic substrate to an IC of a driving circuit.

The guard film may be formed (1) by screen printing poxy resin, (2) by spraying Teflon (Trade Name) or (3) by painting Neolon (Trade Name), varnish, etc. so as to protect the transparent electrode in a simple manner.

Figure 16:
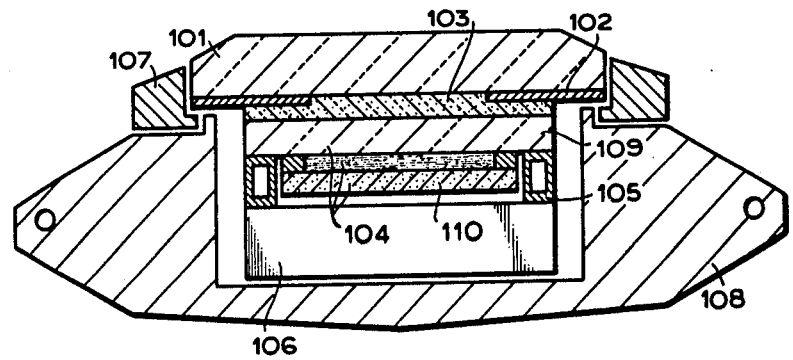
FIG. 16 is a longitudinal sectional view of an embodiment of an electrochromic display watch according to the invention.

In FIG. 16 there is shown an electrochromic display watch according to the invention. The watch is composed of a windshield 101, a peripheral print portion 102, a transparent bond layer 103, an electrochromic display device 104, a connector 105, a circuit portion 106, a glass fixture 107 and a case 108. The electrochromic display device 104 is composed of an upper glass substrate 109 and a lower substrate 110.

Figure 17:
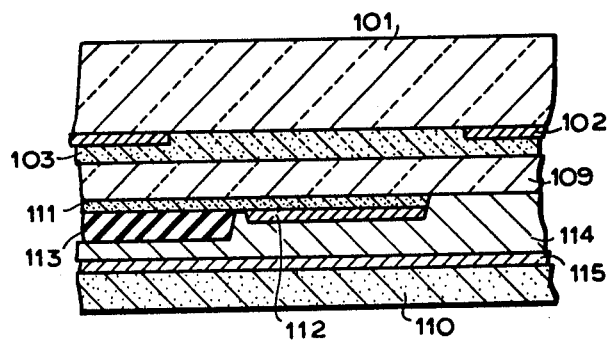
FIG. 17 is an enlarged longitudinal cross sectional view of the electro-chromic display watch shown in FIG. 16 showing main parts thereof.

In FIG. 17 there are shown main parts of the watch shown in FIG. 16. Between the upper glass substrate 109 and the lower substrate 110 are inserted an upper transparent electrode 111, an electrochromic layer 112, an insulating layer 113, an electrolyte 114 and an opposite electrode 115.

The windshield 101 is formed of a crystalline reinforced glass. On the peripheral print portion 102 are printed a demarcation line, a maker's name, a watch's name, etc. by a screen printing process.

The upper glass substrate 109 is formed of a thin glass having a thickness of the order of 300μ. The overall surface of the upper transparent electrode 111 is vapor deposited with $In_2O_3$ or $S_nO_2$ and the like and changed into patterns by photoetching.

The electrochromic layer 112 is composed of a thin film formed of $WO_3$, $MoO_3$ and the like by vapor deposition, sputtering, vapor phase grown process, etc. The insulating layer 113 is composed of a transparent thin film formed of SiO, $SiO_2$ and the like or a transparent thick film formed of a low melting point glass and the like.

The electrolyte 114 is formed of a propylene carbonate solution containing 5% of $LiClO_4$ and injected from an injection opening (not shown) into a space formed between the upper glass substrate 109 and the lower substrate 110.

The lower substrate 110 is composed of a white substrate formed of an opal glass, ceramic and the like and provided thereon with the opposite electrode 115 which has a low resistance value and is transparent.

The thin type electrochromic display device 104 is closely adhered and secured to the windshield 101 by means of the transparent adhering layer 103 formed of epoxy resin, silicon, adhering substance, etc. The thin type electrochromic display device 104 thus physically reinforced is driven by a driving signal transferred thereto from the circuit portion 106 through the connector 105. The electrochromic display watch shown in FIG. 16 used particularly as a wrist watch, etc. can sufficiently withstand against shocks subjected thereto when it is dropped onto ground.

The transparent adhering layer 103 may be provided with an ultraviolet ray cut filter layer. It is also possible to improve the substance resistant property of the electrochromic display device 104.

Figure 18:
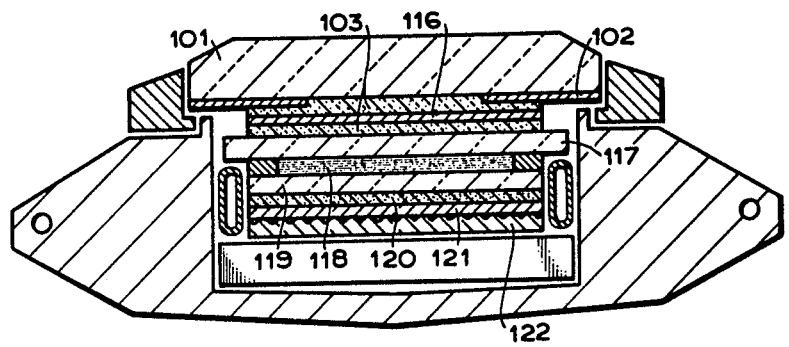
FIG. 18 is a longitudinal sectional view of a modified embodiment of the electro-chromic display watch shown in FIG. 16.

In FIG. 18 there is shown an embodiment of the invention which makes use of a field effect type liquid crystal display device closely adhered and secured to a windshield 101. The present embodiment is composed of a windshield 101, a peripheral print portion 102, a transparent adhering layer 103, a first rectilinear light deflecting plate 116 serving also as an ultraviolet ray cut filter, an upper glass substrate 117, a twistnematic liquid crystal layer 118, a lower glass substrate 119, a lower adhering layer 120, a second rectilinear light deflecting plate 121 and a reflecting layer 122. The effect of the present embodiment is the same as that of the embodiment shown in FIG. 16.

As the electronic display device, use may be made of a photodiode display device. In such a case, if the photodiode emits a red color, the windshield 101 may be formed of a red glass. In addition, the transparent adhering layer may be provided with a red filter.

In the above described timepiece with the electronic display device composed of the liquid crystal display, electrochromic display, photodiode display, etc., a part or all of the electronic display device may be closely adhered and secured to the windshield 101 so as to eliminate a gap formed therebetween. The use of the measures described provides the important advantage that the electronic display device becomes thin and can reinforce its physical strength, thereby providing a highly reliable thin type timepiece.

Figure 1:
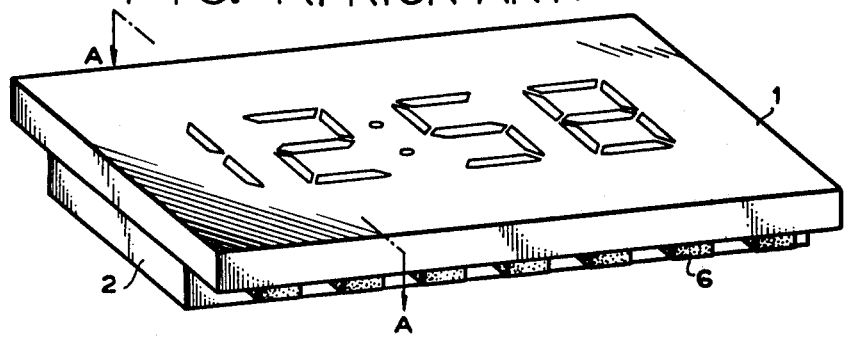
FIG. 1 is a schematic perspective view of a conventional liquid crystal display cell.
Figure 19:
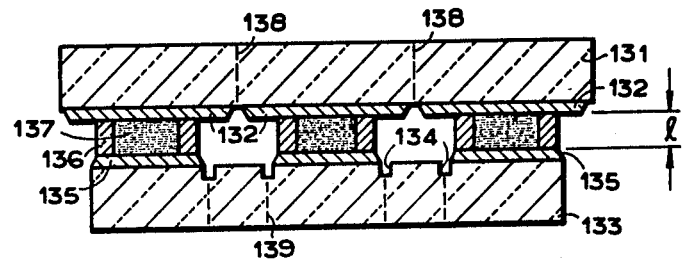
Figure 20:
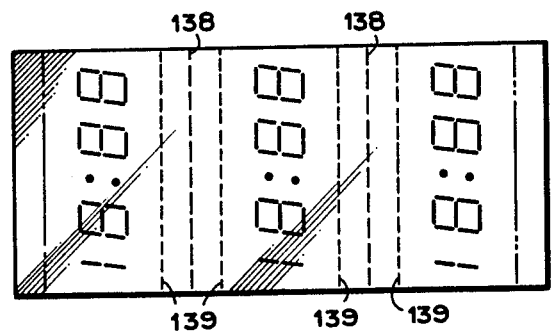

A conventional method of manufacturing a liquid crystal display panel by dividing upper and lower substrates whose outer shapes are different from each other into a plurality of segments will now be described with reference to FIG. 19. A large type upper glass substrate 131 shown in FIG. 19 is provided with three display pattern electrodes 132 each composed of a transparent film formed of $In_2O_3$, $SnO_2$, etc. A large type lower glass substrate 133 is provided with four grooves 134 and with three common electrodes 135. A sealing portion 136 is formed by sintering low melting point glass powders. Between the upper and lower glass substrates 131, 133 there is formed a gap l having a thin thickness of about 5μ to 10μ and filled with a liquid crystal 137 injected and sealed therein. Reference numeral 138 designates those lines of the large type upper glass substrate 131 at which the substrate 131 is cut into three segments and 139 illustrates those lines of the large type lower glass substrate 133 at which the substrate 133 is cut into three segments. One of the liquid crystal panel segments thus cut is shown in FIG. 1.

Figure 21:
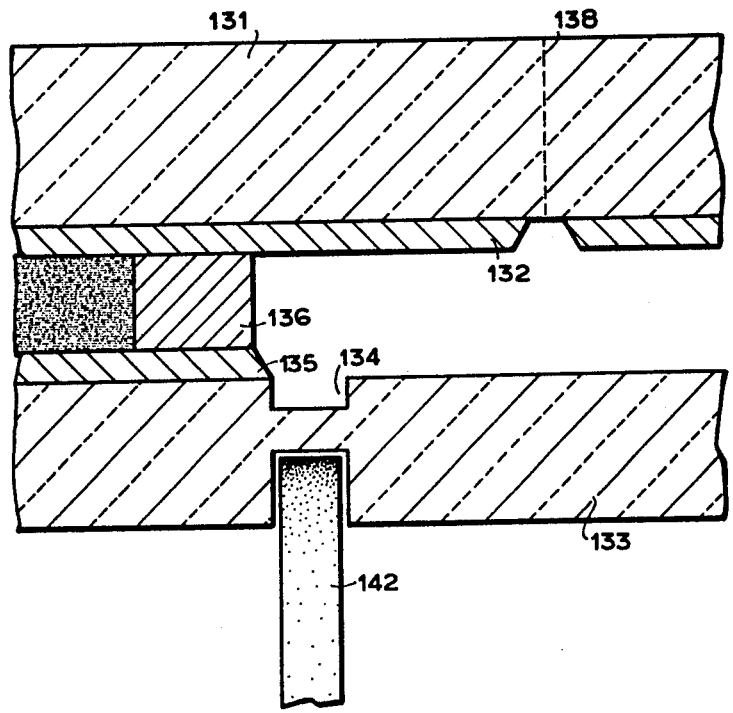

In FIG. 21 is illustrated a cutting step of cutting the large type lower glass substrate 133. A diamond cutting blade 142 of a slicing machine is driven until it arrives at the groove 134. If the diamond cutting blade 142 is overdriven so as to cut the display pattern electrode 132, the display pattern electrode 132 becomes deteriorated.

As described above, the conventional method of dividing the upper and lower substrates into a plurality of segments has the drawback of requiring three steps comprising providing the cutting grooves 134, cutting the cutting lines 139 of the large type lower glass substrate 133 and cutting the cutting lines 138 of the large type upper glass substrate 131, and of deteriorating the display pattern electrode 132 when the diamond cutting blade 142 is overdriven.

Figure 22:
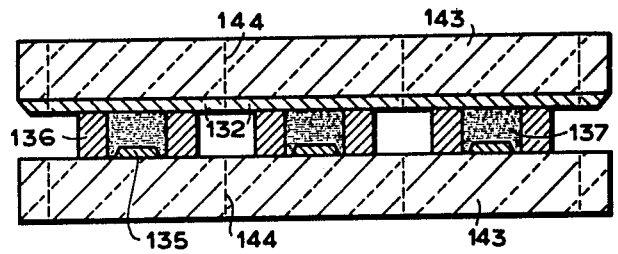
Figure 23:
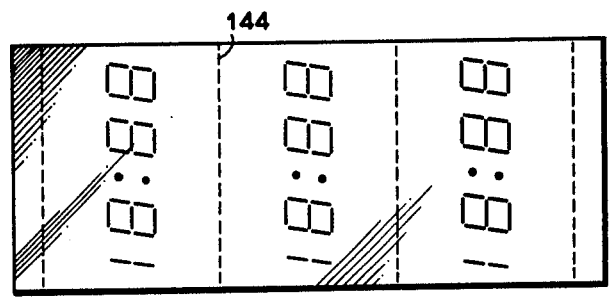
Figure 24:
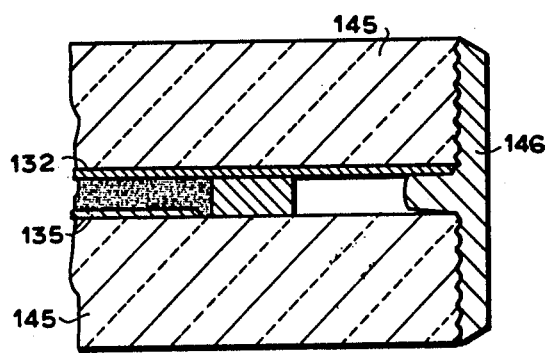

In FIGS. 22 to 24 there is illustrated a method of manufacturing an embodiment of a liquid crystal display panel according to the invention. In the method according to the invention, a large type glass substrate 143 is used in common for both the upper and lower glass substrates. In FIG. 22 there are shown a display pattern electrode 132, a common electrode 135, a sealing portion 136 and a liquid crystal 137. The upper and lower glass substrates 143 are cut by one cutting step through common cutting lines 144 aligned at the same positions in the upper and lower glass substrates 143. FIG. 23 is its plan view. One of the liquid display panels thus separated from each other is shown in FIG. 3.

In FIG. 24 is shown a lead electrode 146 in an enlarged scale. A part of the lead electrode 146 is penetrated into a gap having a width of 5 to 10μ and formed between upper and lower glass substrates 145, 145 and electrically connected to the display pattern electrode 132. The lead electrode 146 may be formed by CVD process, PVD process, screen printing process or dispenser process and the like.

The step of forming the lead electrode 146 may also be used as a step of transferring the common electrode 135. As a result, number of steps of manufacturing a display panel for a table calculating machine which makes use of a matrix driving system and requires to transfer the common electrode 135 to many places can be significantly reduced.

Figure 25:
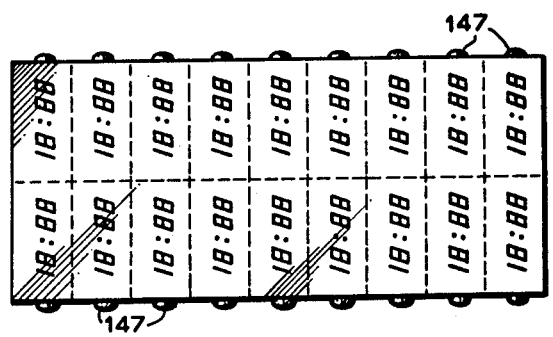
FIG. 25 is a plan view of a modified embodiment of the continuous display panel shown in FIG. 23.

In FIG. 25 is shown another embodiment of a display panel according to the invention. In the present embodiment, 18 display panels can simultaneously be manufactured. Reference numeral 147 designates a solder sealing portion.

In the embodiment shown in FIG. 22, use is made of one and same large type glass substrate 143 in common. Alternatively, the lower glass substrate only may be made thin or the upper glass substrate may be made thin.

As stated hereinbefore, in the case of manufacturing a liquid crystal display panel comprising adhering or sealing two glass substrates which are the same in plane configuration and sealing in a gap formed between said two substrates an electrochemical substance such as liquid crystal, electrochromic substance, etc., the invention makes use of a large type glass substrate from which can manufacture a plurality of liquid crystal display panels, on said substrate are formed a plurality of display pattern electrodes, said two substrates are adhered or sealed together to form an assembly and then the assembly is divided into a plurality of liquid crystal display panels. As a result, the method according to the invention has the advantage that two cutting steps of the conventional method can be omitted, that there is no risk of the display pattern electrode being deteriorated by over-driving the cutting blade, and that it is sufficient to add only a step of forming the lead electrode 146. Thus, the invention significantly contributes to the liquid crystal display panel production field.

The step of cutting the substrates may be effected by means of not only slicing machine but also an etching process with the aid of hydrofluoric acid, a laser cutting process and the like.

Figure 26:
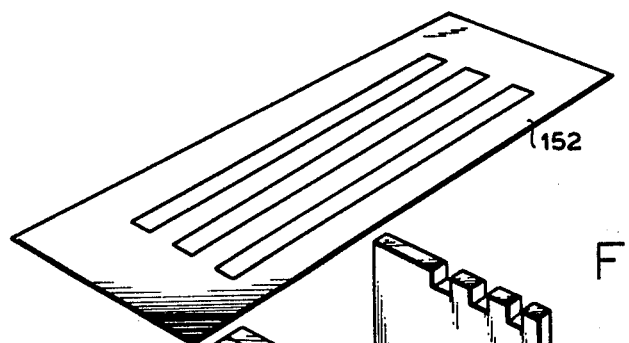

In FIG. 26 there is shown a mask arrangement used for vapor depositing a side surface lead electrode according to the invention. The mask arrangement is composed of a liquid crystal display panel 151, side surface masks 152 and plane surface masks 153. In practice, several tens of liquid crystal display panels 151 and plane surface masks 153 are alternately arranged in seccession and pressed together and two side surface masks 152 are arranged at the side surfaces thereof.

Figure 27:
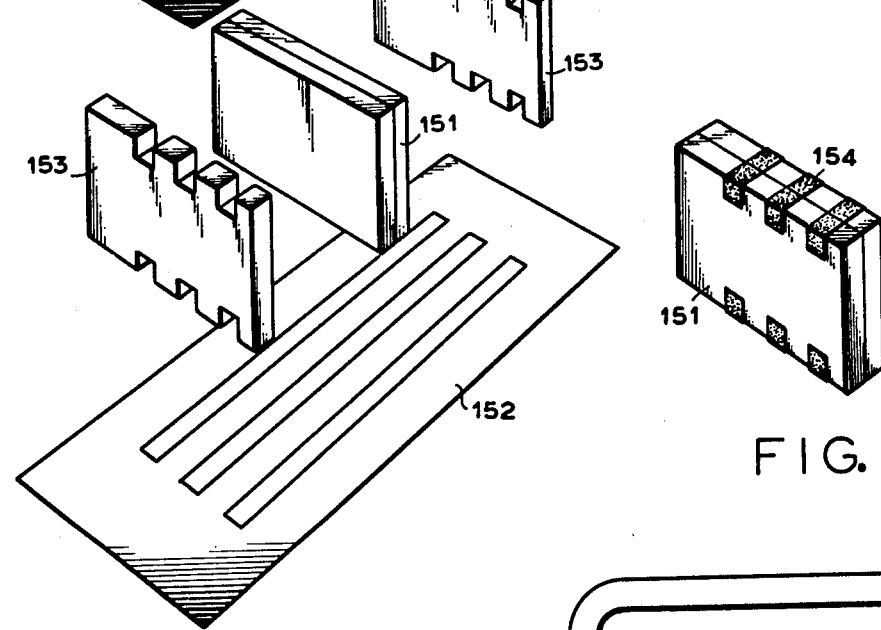

In FIG. 27 there is shown a liquid crystal display panel 151 with side surface lead electrodes 154 vapor deposited thereon using the mask arrangement shown in FIG. 26.

Figure 28:
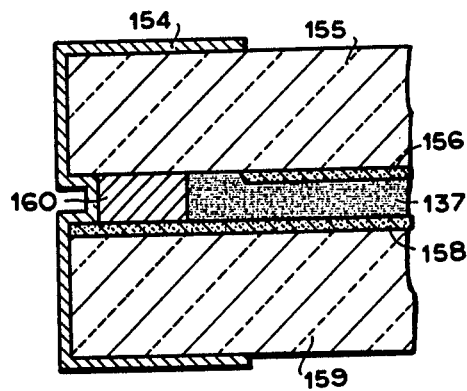

In FIG. 28 there is shown the liquid crystal display panel 151 shown in FIG. 27 in an enlarged scale. The liquid crystal display panel 151 is composed of an upper glass substrate 155, an upper transparent electrode 156, a twistnematic liquid crystal layer 157, a lower transparent electrode 158, a lower glass substrate 159, a low melting point sealing portion 160 and a side surface lead electrode 154. On a large type glass substrate prior to cutting thereof is vapor deposited a transparent electrode formed of $In_2O_3$, $SnO_2$, etc. Then, the transparent electrode thus formed is formed into patterns so as to constitute the upper transparent electrode 156 and lower transparent electrode 158, respectively, on which there are formed orientation layers by means of SiO obliquely vapor deposition process. Then, low melting point glass powders are printed by screening and sintered to form a low melting point glass sealing portion 160. Subsequently, a liquid crystal substance is injected from an injection slit (not shown) into a gap formed between the upper and lower glass substrates 155, 159 and sealed by soldering to form the twistnematic liquid crystal layer 157. Then, the large type glass substrates are cut into segment each having a given dimension to form respective liquid crystal display panels 151 shown in FIG. 27. Subsequently, the side surface lead electrode 154 composed of a thin film formed of Cr, Au and the like is vapor deposited with the aid of the mask arrangement as described with reference to FIG. 26.

The upper transparent electrode 156 may be connected through a silver electrically conductive portion, the lower transparent electrode 158 and the side surface lead electrode 154 to exterior circuits. The upper transparent electrode 156 may be connected through the silver electrically conductive portion located near the liquid crystal substance injection opening to the lower transparent electrode 158. Alternatively, the upper transparent electrode 156 may be connected to the exterior circuit by means of the mask vapor deposition process as described above.

Figure 29:
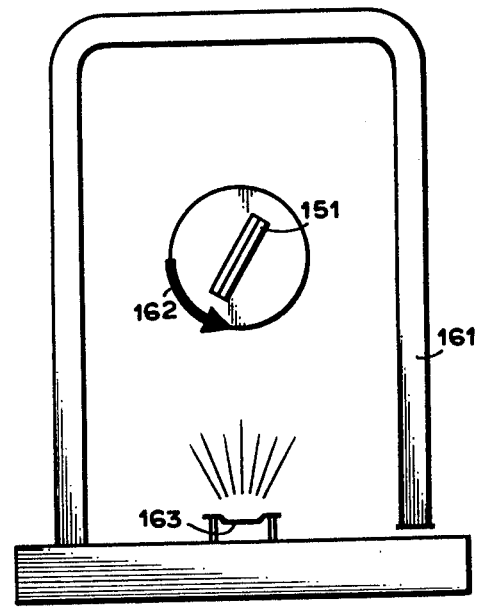

In FIG. 29 there is shown a rotatably mounted jig to be used in the above described mask vapor deposition process. In a bell jar 161 are rotatably mounted a plurality of liquid crystal display panels 151 and mask arrangement (not shown). The panels 151 are rotated in a direction shown by an arrow 162. Cr, Cu are evaporated from a resistor heating boat 163 and vapor deposited on the panels 151.

As shown in FIG. 28, the side surface lead electrode 154 is formed at one end of the lower transparent electrode 158, and as a result, it is possible to apply an electric field across the twistnematic liquid crystal layer 157.

As stated hereinbefore, in the case of manufacturing a liquid crystal display panel comprising adhering or sealing two substrates which are the same in plane configuration and sealing in a gap formed between said two substrates an electro-optical substance such as liquid crystal, electrochromic substance, etc., the invention makes use of a large type substrate from which can manufacture a plurality of liquid crystal display panels, on said substrate is formed a plurality of display pattern electrodes, said two substrates are adhered or sealed together to form an assembly, then the assembly is divided into a plurality of liquid crystal display panels, and finally a side surface lead electrode is formed on at least the side surface of said substrate by mask vapor deposition process. As a result, the method according to the invention has the advantage that a highly reliable liquid crystal display panel can be produced in a mass production scale and in a less expensive manner.

What is claimed is:

1. An electro-optical display device comprising
(a) a first substrate having at least one side and a face perpendicular to said side;
(b) a second substrate having at least one side and a face and having the same size and configuration as said first substrate, the face of said second substrate mounted opposite the face of said first substrate thereby forming a gap therebetween;
(c) an electro-optical substance sealed within the gap formed between said substrates;
(d) a first electrode attached to the face of said first substrate between said first substrate and said electro-optical substance;

(e) a second electrode opposing said first electrode and attached to the face of said second substrate between said second substrate and said electro-optical substance;

(f) a lead electrode connected to said first electrode and mounted to and extending along said at least one side of said first substrate; and (g) an insulating, protective film covering said lead electrode.

2. The electro-optical display device of claim 1 wherein said second substrate is transparent and has a thickness less than 0.5 mm, said second electrode being a common electrode.

3. The electro-optical display device of claim 1 wherein said protective film is formed on a peripheral edge of said first substrate inclusive of said lead electrode.

4. The electro-optical display device of claim 3 wherein said protective film is formed at a lower surface portion of said first substrate.

5. The electro-optical display device of claim 1 wherein said protective film is screen printed epoxy resin.

6. The electro-optical display device of claim 1 wherein said protective film is sprayed Teflon.

7. The electro-optical display device of claim 1 wherein said protective film is a painted varnish.

8. An electro-optical display device comprising:
(a) a first substrate having at least one side and a face perpendicular to said side;
(b) a second substrate having at least one side and a face and having the same size and configuration as said first substrate, the face of said second substrate mounted opposite the face of said first substrate thereby forming a gap therebetween;
(c) an electro-optical substance sealed within the gap formed between said substrates;
(d) a first electrode attached to the face of said first substrate between said first substrate and said electro-optical substance;
(e) a second electrode opposing said first electrode and attached to the face of said second substrate between said second substrate and said electro-optical substance;
(f) a lead electrode connected to said first electrode and mounted to and extending along said at least one side of said first substrate; and
(g) said first substrate further including a plurality of grooves in said at least one side thereof, said lead electrode located at least within said grooves.

9. The electro-optical display device of claim 8 wherein said grooves have a triangular shape and are spaced apart from each other by a small pitch thereby forming a side surface between adjacent grooves and said lead electrode is mounted on the side surface between adjacent grooves.

10. The electro-optical display device of claim 8 wherein said grooves have a semi-circular shape and said lead electrode is located within said groove.

* * * * *